United States Patent Office 3,181,162
Patented Apr. 27, 1965

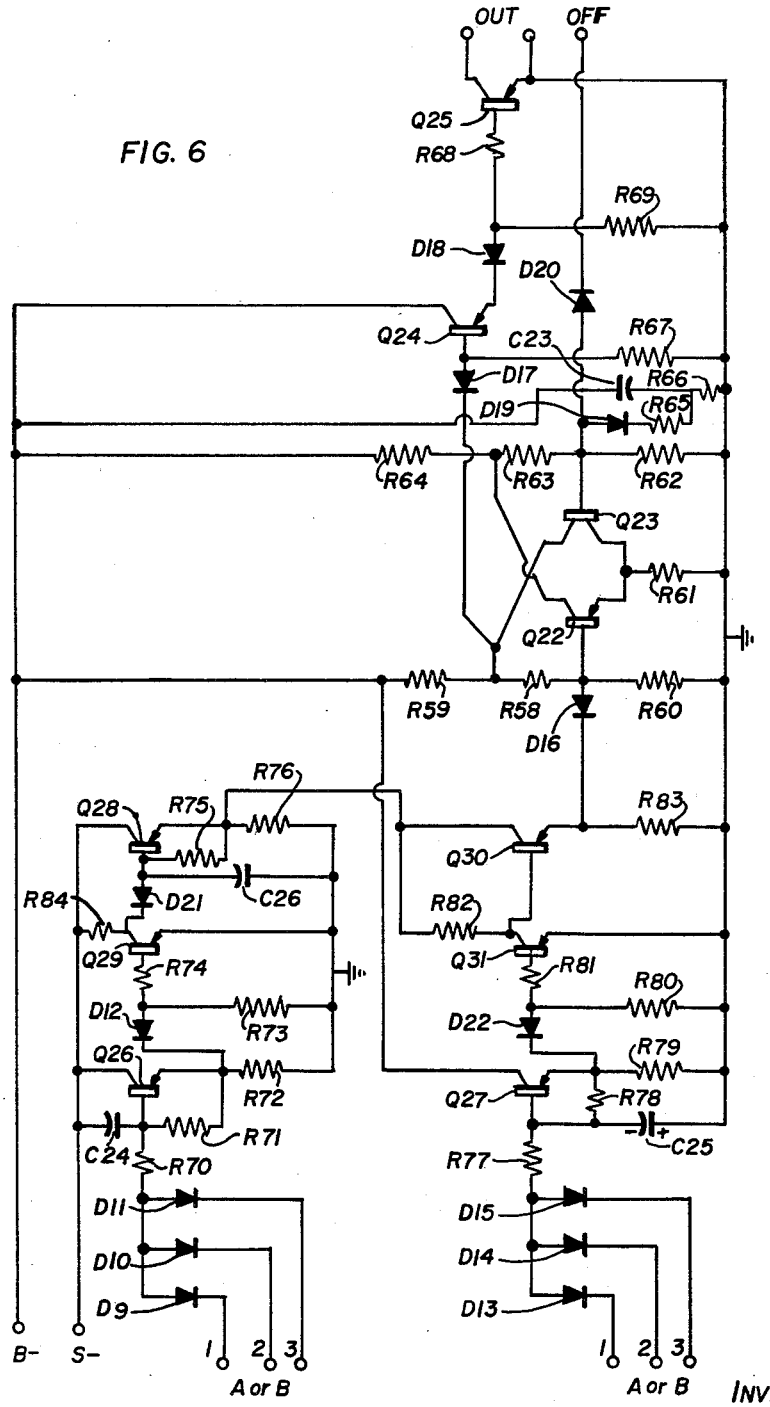

3,181,162
RADIO REMOTE CONTROL SYSTEM HAVING COUNTER MEANS RESPONSIVE TO PLURAL CODES
William McKinley Cameron, Ottawa, Ontario, Canada, assignor to National Research Council, Ottawa, Ontario, Canada, a body corporate of Canada
Filed June 5, 1961, Ser. No. 127,417
15 Claims. (Cl. 343—225)

This invention relates to apparatus for detecting digital codes and is of particular advantage in a radio remote control system such as is used in the navigational aids field to detect a radiated predetermined digital code.

In the navigational aids field there is a recurrent problem in the development of suitable apparatus for providing simple and reliable remote control of electrical switching to operate equipment at an isolated site. Such apparatus, for example, is desirable to control fog signals or unattended beacons located at a remote station. Often it is necessary to effect such control using existing radio transmitters fitted on ships or aircraft with little or no modification.

Motor driven selectors at a remote site have been used in navigational aids systems, but these are slow in operation and subject to mechanical failure. According to another known method the control signals which control operations at a remote station take the form of audio frequency pulse modulation of a common carrier frequency signal, with a different pulse repetition rate distinguishing each respective control channel. Simultaneous control of several discrete operations at the remote station is obtained by modulating the transmitted carrier wave signal simultaneously with pulses at the several different repetition rates, each representing a respective control channel. Upon demodulation of the carrier in a receiver at the remote control station, the pulses at the several different pulse repetition rates are separated by suitable filters for subsequent selective control of the different respective remote operations. However, such a system in view of its complications is not as reliable as is desirable for navigational aids systems. Also, a serious disadvantage is that the navigational aids are only available to transmitting stations having special equipment. The present invention provides remote control apparatus which is not only very reliable but makes the system available to any transmitting station having radio transmitting equipment capable of radiating a keyed signal. For example, when a ship or an aircraft equipped with such radio transmitting equipment is in the vicinity of an unattended fog signal or beacon, simple and reliable means are made available to control the operation of these navigational aids.

According to the invention, apparatus is provided for use at a remote station to detect a predetermined digital code having at least two series of pulses each series representing a digit of the digital code. The apparatus comprises means for receiving a series of pulses, a pulse counter for the sequential counting of each series of pulses and for sequentially registering the count of the first series of pulses and the count of the sum of the first and second series of pulses. First selecting means are provided to select the registered count of the first series of pulses and to produce a first voltage representing the first digit of the predetermined digital code and second selecting means are provided to select the registered count of the sum of the first and second series of pulses and to produce a second voltage representing the predetermined digital code. A memory means which is responsive to the voltage produced by the first selecting means is interposed between the first and second selecting means, the second selecting means being rendered operable only when this first voltage is applied thereto. The voltage from the second selecting means, representing the predetermined digital code, may then be used to control the switching "on" or "off" of selected equipment at a remote station. This is achieved by further providing power control means which are responsive to the voltage from the second selecting means to switch on the selected equipment; and the first and second selecting means and the memory means may be duplicated to respond to another predetermined digital code to cause the power control means to switch off selected equipment once switched on.

It has been found preferable to use negative modulation of a control carrier at the transmitting station to produce the series of pulses representing the digital code. The use of negative modulation reduces the probability of random interference falsely operating the apparatus.

With negative modulation, standby power can be provided to maintain certain circuit components energized at all times, in order to conserve power consumption at a remote station. When the control carrier signal is received at the remote station, a local power switch adapted to respond to the appearance of the control carrier signal can then connect power to other circuit components which are necessary to detect the predetermined digital code.

Thus, the apparatus according to my invention can be used to provide reliable remote control in conjunction with any radio transmitter capable of being hand-keyed. The transmitter may be keyed with the "push-to-talk" button or the conventional Morse key. However, the use of a telephone dial at the transmitter has been found to be more convenient and somewhat faster in operation.

Reliability is built into the apparatus so that if the first series of pulses received is other than the predetermined first series of pulses, the second selecting means will remain inoperable. This feature is achieved by utilizing the voltage developed in the memory means as the power supply for the second selecting means.

The reliability of the apparatus is also increased by the provision of noise rejection means to give effective attenuation to nearly all types of noise that could, when present with the pulses, affect the proper operation of the apparatus.

The apparatus of my invention is adapted to the use of transistors and computer techniques to give great flexibility in operation.

An embodiment of the invention will now be described by way of example, with reference to the accompanying drawings in which:

FIGURE 6 is a detailed schematic diagram of a modified embodiment of FIGURE 5 which permits the apparatus to operate over a wider temperature range.

Figure 1:
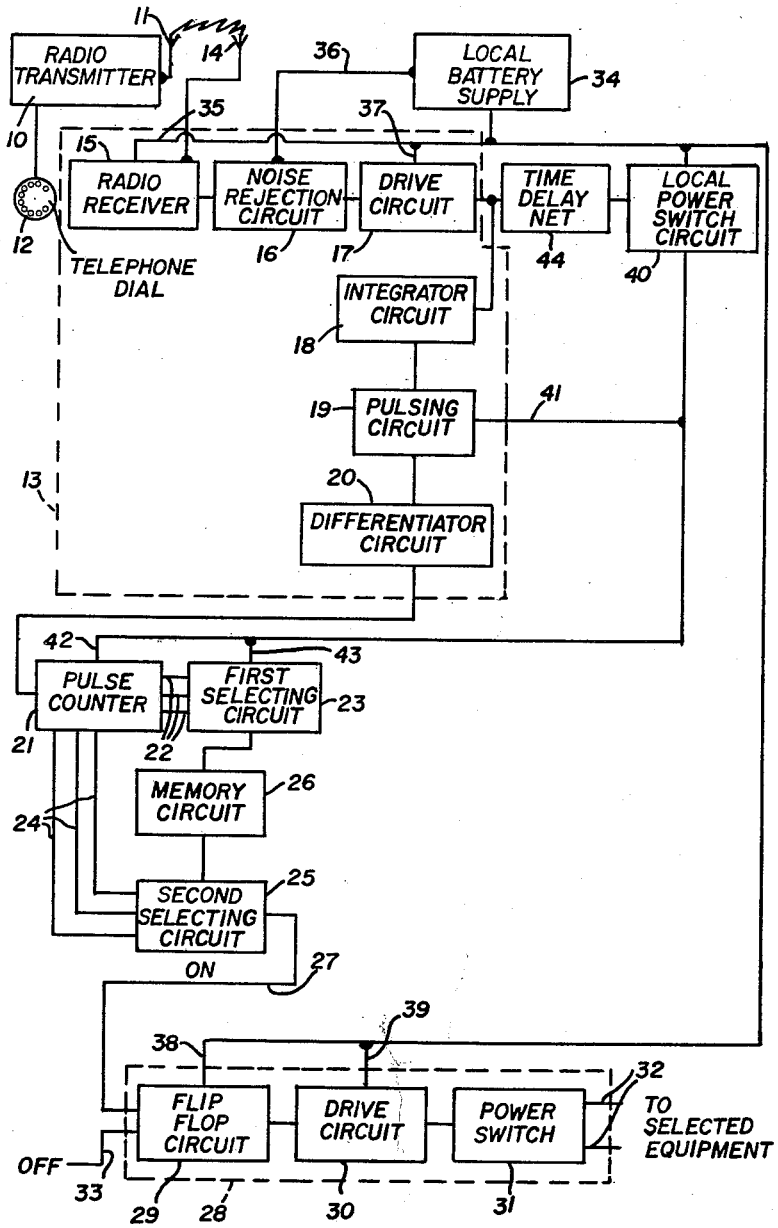
FIGURE 1 is a block schematic diagram of a remote control system showing the apparatus adapted for use at a remote radio station and a radio transmitter for transmitting a digital code.

Referring to FIGURE 1, there is shown a radio transmitter 10 and an antenna 11, such as would be located on a vehicle requiring navigational aid. The antenna 11 transmits a control carrier signal when the transmitter 10 is energized. A telephone dial 12 is connected to the transmitter 10 such that the operation of the dial 12 will interrupt the control carrier signal a number of times corresponding to the digit dialed. A series of pulses corresponding to a predetermined digital code can thus be transmitted by the antenna 11 using this negative modulation technique. The apparatus of my invention is particularly adapted to the use of a two digit code.

A receiving means 13, enclosed by a dotted rectangle, suitable for use at a remote station is provided to detect the series of pulses radiated from antenna 11. For this purpose, the receiving means 13 comprises an antenna 14, a radio receiver 15, a noise rejection circuit 16, a drive circuit 17, an integrator circuit 18, a pulsing circuit 19 and a differentiator circuit 20, operatively connected together. The output from differentiator circuit 20 is connected to a pulse counter 21. The pulse counter 21 comprises three cascaded binary scalers, the details of which will be described hereinafter with reference to FIGURE 4. A predetermined output from each binary scaler is connected via conductors 22 to a first selecting circuit 23, and a predetermined output from each binary scale is connected via conductors 24 to a second selecting circuit 25. A memory circuit 26 is interposed between the first and second selecting circuits 23 and 25, the output from the second selecting circuit 25 appearing on conductor 27.

In operation, the transmitted control carrier signal containing the series of pulses, which appear as holes or gaps in the carrier signal, is received by the antenna 14 and detected in the receiver 15. The receiver 15 is preferably a fixed tuned transistorized receiver containing noise rejection circuits. The detected signal is applied to the noise rejection circuit 16 and through the drive circuit 17 to the integrator circuit 18. The noise rejection circuit 16 functions as a low-pass filter having a frequency cut-off of a few cycles per second. The integrator circuit 18 comprises an R-C network having a time constant equal to about one half the width of a dial pulse. The integrator circuit 18 is provided as a secondary noise rejection means and provides some attenuation to interference spikes which may occur during the pulses when the carrier is missing. The provision of the noise rejection circuit 16 and the integrator circuit 18 ensure very reliable operation of the apparatus in the presence of serious noise interference. The pulsing circuit 19 reconstructs the delayed pulses from the integrator circuit 18 and applies the reconstructed pulses to the differentiator circuit 20 which produces a series of triggering pulses to activate the pulse counter 21.

The pulse counter 21 is adapted to sequentially count the first and second series of pulses applied thereto and to sequentially apply at its outputs the registered count of the first series of pulses, and the registered count of the sum of the first and second series of pulses. The first selecting circuit 23 is adapted to select from the pulse counter 21, via conductors 22, a predetermined registered count of the first series of pulses and during the interval between the first and second series of pulses, to apply a voltage representing the first digit of the digital code to the memory circuit 26. The second selecting circuit 25 is adapted to select from the pulse counter 21, via conductors 24, a predetermined registered count of the sum of the first and second series of pulses and to apply a voltage on conductor 27 representing the predetermined digital code. The memory circuit 26 is responsive to the voltage from the first selecting circuit 23 and serves as the power supply for the second selecting circuit 25. In this way, the second selecting circuit 26 is rendered operable only when the first selecting circuit 23 has selected the predetermined first series of pulses.

When it is desired to utilize a detected digital code to control the switching "on" or "off" of selected equipment at the remote station, a power control circuit 28, enclosed by a dotted rectangle, is provided. This power control circuit 28 comprises a bistable flip-flop circuit 29, which acts as a power switch memory, the output from which is connected through a drive circuit 30 to a power switch 31. A voltage from the second selecting circuit 25 appearing on the conductor 27 effectively becomes an "on" command signal causing the flip-flop circuit 29 to change its state, thereby operating the drive circuit 30 and the power circuit 31 to connect power to the selected equipment via conductors 32. In order to control the switching "off" of the selected equipment, a further first and second selecting circuit and memory circuit (not shown), similarly connected together and to the pulse counter 21, may be provided to detect another predetermined digital code. A voltage from the further second selecting circuit may be applied on conductor 33 and this voltage effectively becomes an "off" command signal causing the flip-flop circuit 29 to revert to its original stage, to cause the disconnecting drive circuit 30 and power circuit 31 and the power from the selected equipment.

It may be desirable in order to conserve power consumption at the remote stations to provide standby power to maintain certain circuit components energized at all times and to energize other circuits only when the control carrier signal has been detected. For this purpose, a local battery supply 34 connects power to the receiver 15, the noise rejection circuit 16, the drive circuit 17, the flip-flop circuit 29 and the drive circuit 30 via conductors 35, 36, 37, 38 and 39 respectively. When the control carrier signal has been detected in the receiver 15, a local power switch circuit 40, adapted to be responsive to the drive circuit 17 connects operating voltage to the pulsing switch 19, the pulse counter 21 and the first selecting circuit 23 via conductors 41, 42 and 43 respectively. A time delay network 44 is interposed between the drive circuit 17 and the power switch circuit 40. The time delay network 44 comprises a resistor-capacitor network whose time constant is such as to maintain the local power switch circuit 40 operating during dial pulse intervals when the control carrier signal is missing. The local power switch circuit 40 opens about two seconds after the termination of the control carrier signal and the apparatus reverts to the standby condition. Thus negative modulation is advantageously used to conserve power consumption at the remote station. The voltage produced by the local power switch circuit 40 also serves to activate a reset circuit in the pulse counter 21 in a manner to be described in more detail with reference to FIGURE 3.

Figure 2:
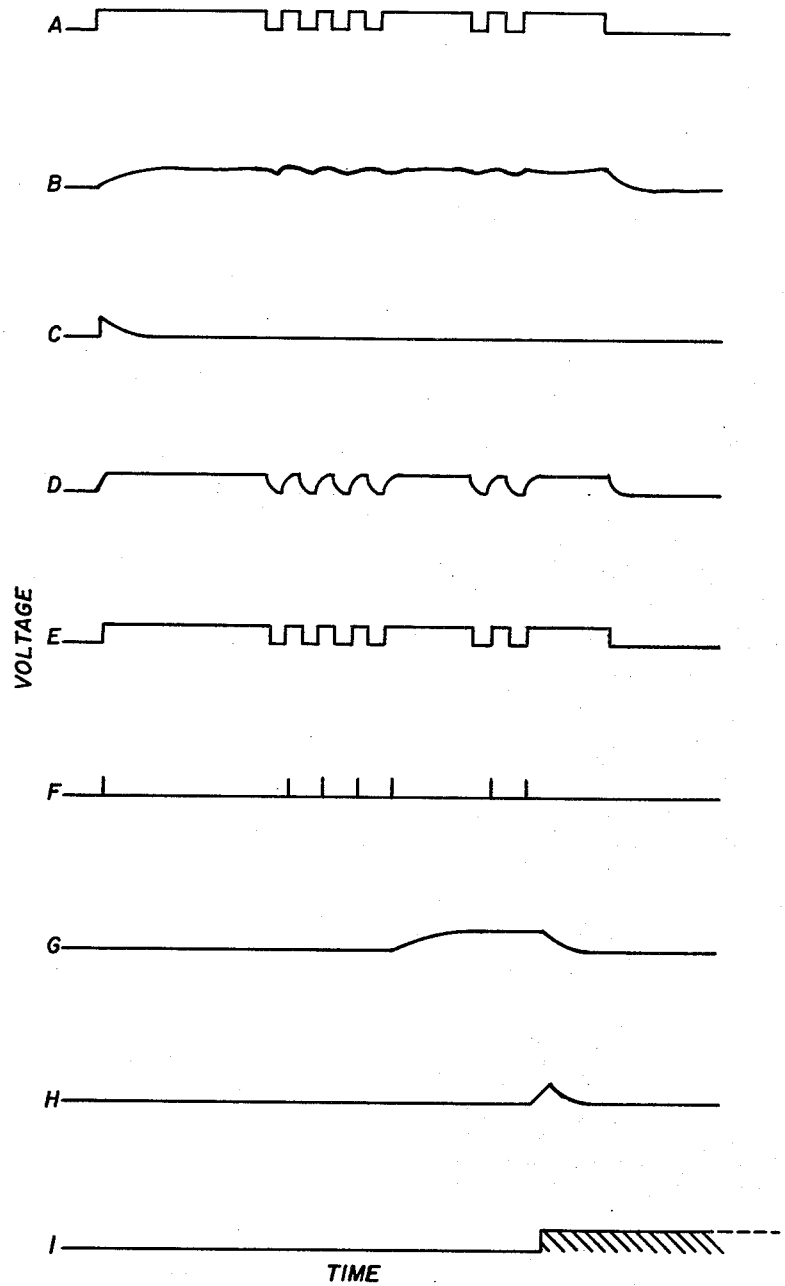
FIGURE 2 is a series of voltage-time wave forms produced at different stages of the circuits of FIGURE 1 for a transmitted series of pulses corresponding to the digital code representing the number 42.

The functions of certain circuit components of FIGURE 1 will be more clearly understood with reference to the voltage-time wave forms of FIGURE 2. Waveform A shows the detected control carrier signal containing pulses corresponding to the digital code representing the two digit number 42. This waveform appears at the output of the radio receiver 15 after the control carrier signal has been detected. Waveform B represents the voltage appearing on the conductors 41, 42 and 43 to provide operating voltage to the pulsing circuit 19, the pulse counter 21 and the first selecting circuit 23 respectively, as soon as the control carrier signal has been detected. Waveform C represents the reset voltage produced in the pulse counter 21 in response to the voltage appearing on conductor 42 to reset the binary scalers to binary 000 before the first series of pulses is presented thereto. Waveform D represents the signal appearing at the input to the pulsing circuit 19 after passing through integrator circuit 18. Waveform E represents the reconstructed delayed pulses appearing at the input to the differentiator circuit 20. Waveform F represents the pulses derived from the differentiator circuit 20 to trigger the pulse counter 21. Waveform G represents the voltage produced at the outputs of the first selecting circuit 23 and the memory circuit 26 after the first digit has been selected to provide an operating voltage for the second selecting circuit 25. Waveform H represents the voltage appearing on the conductor 27 immediately after the digital code has been detected by the second selecting circuit 25. Waveform I represents the voltage appearing at the input to the power switch 31 after the flip-flop circuit 29 has been triggered by the voltage of waveform H.

Figure 3:
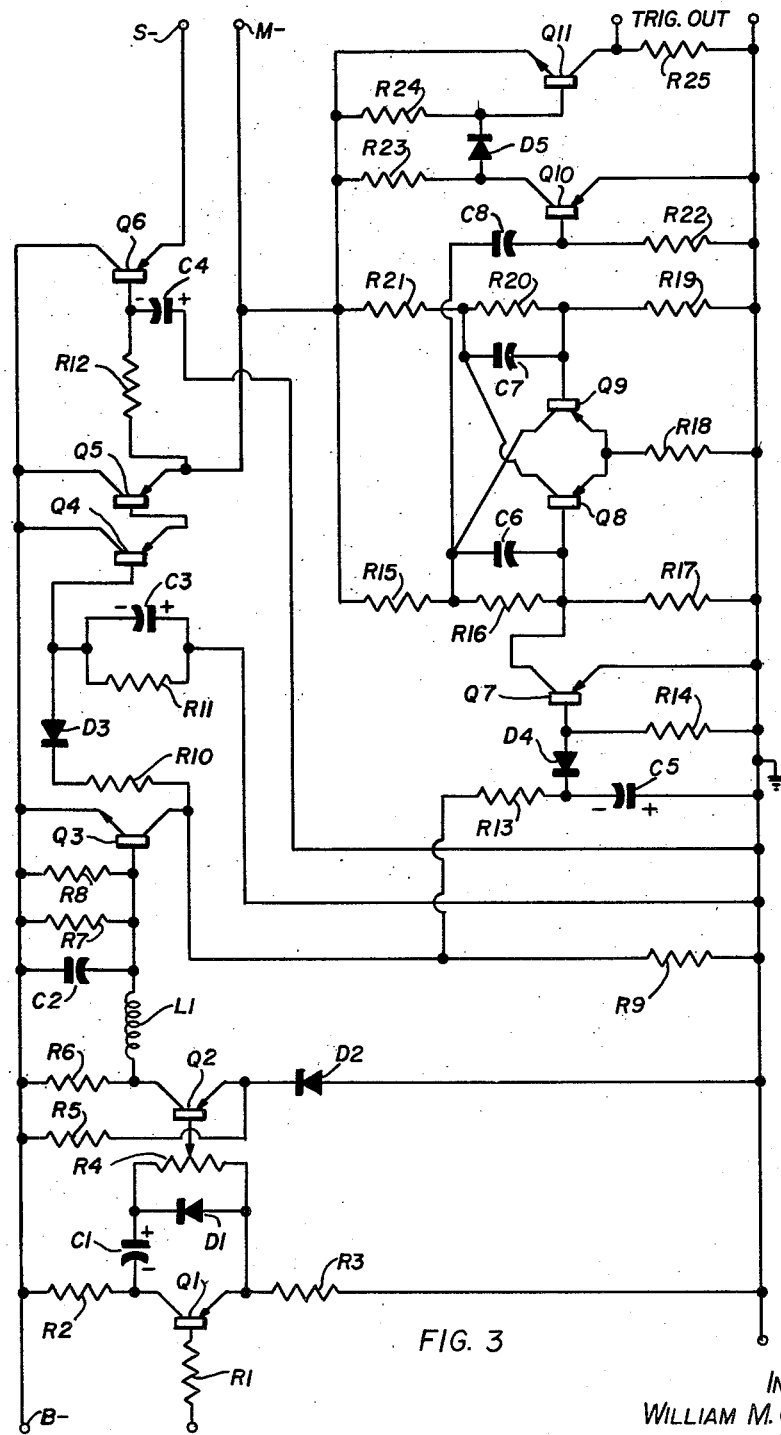
FIGURE 3 is a detailed schematic diagram of the receiving means shown in FIGURE 1 for detecting a series of pulses and of the power switching circuit for connecting power to circuit components when the control carrier signal is received.

For a more detailed description of the receiving means 13, the time delay network 44 and the local power switch circuit 40 of FIGURE 1, reference is now made to FIGURE 3. In the embodiment of the invention described, the radio receiver 15 is adapted to produce a negative going output and consequently, the apparatus is so designed to be responsive only to detected signal voltages from the receiver 15 having a negative going output. It can be readily seen that where a receiver is adapted to produce a positive going output, the apparatus can be suitably designed to be responsive to the positive going output without departing from the spirit of the invention.

When the control carrier signal has been received by the antenna 14 (FIGURE 1) and detected in the receiver 15 (FIGURE 1), the negative going detected signal is applied to the input of the noise rejection circuit 16 (FIGURE 1) at the base of a transistor Q1. Outputs from the transistor Q1 are taken across its collector load resistor R2 and across its emitter load resistor R3. The collector output is reactively coupled through a capacitor C1 to one end of a resistor R4 and the emitter output is directly connected to the other end of the resistor R4. A diode D1 provides a low resistance charge path for the capacitor C1 and the resistor R4, which is connected as a potentiometer, provides a discharge path for the capacitor C1. The adjustable contact of the potentiometer is connected to the base input of a transistor Q2. The collector output of the transistor Q2 is taken across a resistor R6 and is applied to an L-C filter comprising an inductance L1 and a capacitor C2. When the local battery supply 34 is first connected, the capacitor C1 charges.

In the absence of any signal, no significant current flows in the resistors R2 and R3 as there is no bias current into the base of the transistor Q1. When the appearance of any detected signal drives the base of the transistor Q1 negatively, current flows and equal voltages appear across the resistors R2 and R3. The signal out of the collector is positive going and the signal out of the emitter is negative going and hence are 180 degrees out of phase and would cancel in a balanced resistive circuit. Thus, with the potentiometer suitably adjusted, both signals will cancel at the adjustable contact for a transient or A.C. condition and no voltage will appear at the base of the transistor Q2. Thus noise spikes which have a transient character cannot operate the transistor Q2.

However, a control carrier signal which persists for an appreciable period of time can be considered as D.C. This will allow the capacitor C1 to partially discharge through the resistor R4 and the base circuit of the transistor Q2 will become unbalanced. The positive signal contribution from the collector of the transistor Q1 through the capacitor C1 to the upper end of the resistor R4 will decrease with time as the capacitor C1 discharges. The adjustable contact of the potentiometer becomes more negative, eventually overcoming the bias imposed by a diode D2 in the emitter of the transistor Q2 and transistor Q2 conducts. At the end of the control carrier signal the capacitor C1 charges again through the diode D1. The L1-C2 filter is provided at the output of the transistor Q2 to attenuate high frequency noise components which may appear by capacitive feed through from the base to the collector of the transistor Q2.

The output from the L1-C2 filter is applied to the base input of a transistor Q3 (drive circuit 17 of FIGURE 1). The collector output of the transistor Q3 is directly coupled to a transistor amplifier Q4, which drives transistor switches Q5 and Q6. A resistor capacitor network R11-C3 is shunted across the base of the transistor Q4. Time delay network 44 (FIGURE 1) comprises the R11-C4 network and the local power switch circuit 40 (FIGURE 1) comprises the transistors Q5 and Q6. The emitter output of the transistor Q5 connects operating voltage to transistors Q7 to Q11 and provides a bus M to connect operating voltage to the pulse counter 21. The emitter output of the transistor Q6 connects operating voltage on an isolated bus S to the first selecting circuit 23. The separate busses M and S are provided to eliminate interaction between the pulse counter 21 and the selecting circuits 23 and 25. The transistors Q1 to Q6 receive operating voltage from the local battery supply 33.

The collector output of the transistor Q3 is also coupled to a resistor R13 and a capacitor C5, serially connected together to ground (integrator circuit 18 of FIGURE 1). The output from the R13-C5 network is directly coupled to the base input of a transistor trigger amplifier Q7. The collector output of the transistor Q7 triggers a schmidt trigger circuit comprising transistors Q8 and Q9 in a circuit which, because of the different values of base bias due to resistors R17 and R19 reconstructs the delayed pulses from the R13-C5 network, the resulting pulses having very fast rise and fall times. The pulsing circuit 19 of FIGURE 1 comprises this schmidt trigger circuit. The reconstructed pulses are applied from the collector of the transistor Q9 to a capacitor C8 and a resistor R22 (differentiator circuit 20 of FIGURE 1) which are serially connected together to ground. The differentiated pulses are then amplified in transistor amplifiers Q10 and Q11 where they are applied at trigger out to activate the pulse counter 21.

Diodes D4 and D5 are convenient biasing devices in the direct coupled circuits. These diodes have a small voltage drop in the forward direction, the variation of which is tolerable for this application.

Figure 4:
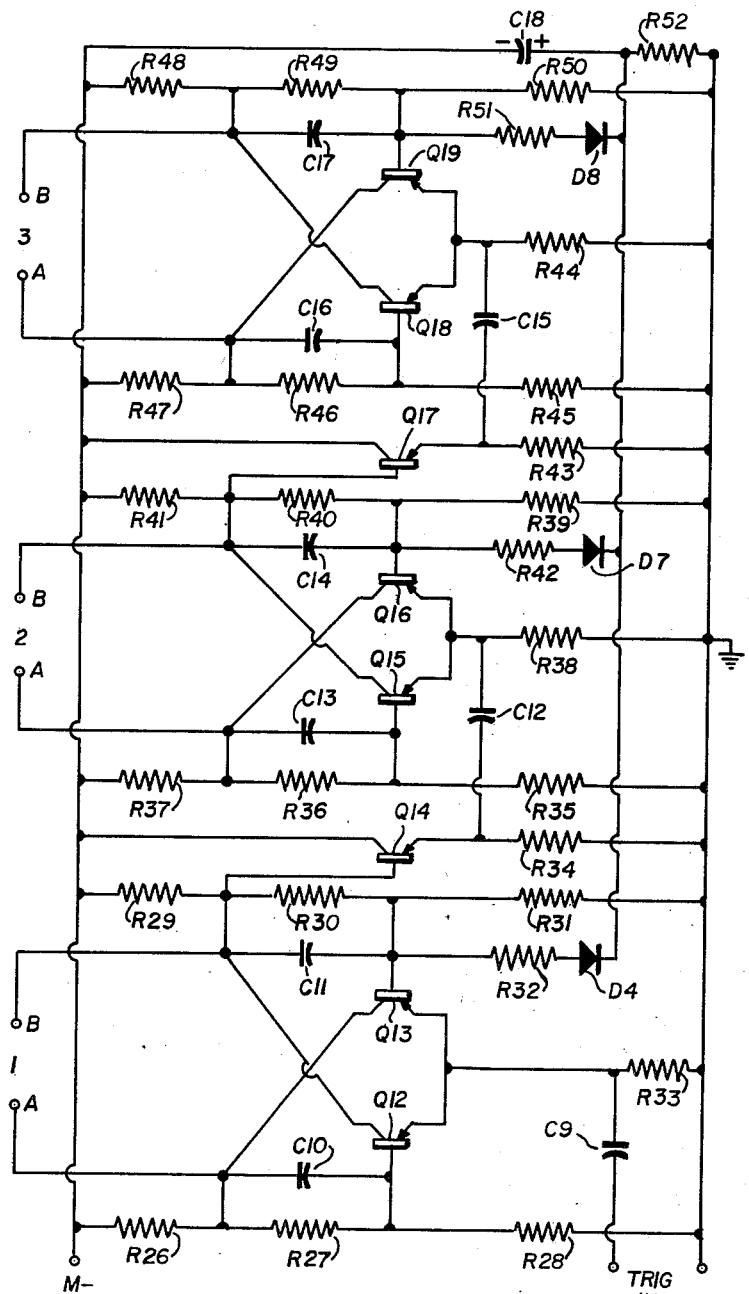
FIGURE 4 is a detailed schematic diagram of the pulse counter of FIGURE 1.

FIGURE 4 will now be referred to for a detailed description of the pulse counter 21 of FIGURE 1. The pulse counter 21 comprises three cascaded conventional binary scalers shown as transistors Q12, Q13, Q15, Q16, and Q18, Q19; each pair of transistors being connected as a bistable flip-flop circuit. Emitter triggering of the flip-flop circuits has been selected as being best suited to this particular application. Transistors Q14 and Q17 are respectively provided as interstage triggering circuits for the common emitter circuits of the flip-flop circuits Q15, Q16 and Q18, Q19. Each flip-flop circuit is provided with two outputs 1A, 1B; 2A, 2B; and 3A, 3B; which are respectively coupled from the collectors of the transistors Q13, Q12; Q16, Q15; and Q19, Q18. When each of the transistors Q12, Q13, Q15, Q16, Q18 and Q19 is conducting or non-conducting, their collectors are maintained at −4 or −0.5 volt respectively, where the battery supply 34 of FIGURE 1 is six volts.

When the control carrier signal has been detected, operating voltage is connected from the bus M to the bases of the flip-flop circuits Q12, Q13; Q15, Q16; and Q18, Q19; and the collectors of the transistors Q14 and Q17. The bus M is also connected through a capacitor C18 and a resistor R52 to ground. The junction of the capacitor C18 and the resistor R52 is directly coupled to the base circuits of the transistors Q13, Q16 and Q19 through diodes D6 to D8 and current limiting resistors R32, R42 and R51. The capacitor C18-resistor R52 network serves as a reset circuit to ensure that the binary scalers are set to binary 000 when the control carrier signal is first detected through the bus M. When the bus M is first energized, the base circuits of the transistors Q13, Q16 and Q19 are momentarily connected thereto through the low reactance of the capacitor C18 and thus, the transistors Q13, Q16 and Q19 are driven into conduction. This causes the flip-flop circuits to change their state, leaving outputs 1A, 2A and 3A at −0.5 volt and outputs 1B, 2B and 3B at −4 volts. The capacitor C18 then charges by the base currents and through the resistor R52, and when fully charged, is freed from the base circuits by diodes D6 to D8. If desired a transistor may conveniently be used in the reset circuit connected to a long time constant circuit to provide a broad reset pulse.

With the binary scalers so set at binary 000, the circuit is then prepared to accept the trigger pulses from FIGURE 3 which are applied to the common emitter circuit of the flip-flop circuit Q12, Q13. The combinations of the other seven binary states determine the 21 two digit codes listed in the first column of Table I given at the end of this disclosure. This table shows the outputs of the binary scalers that will be at −4 volts when a particular two digit code appears at the pulse counter. Considering the case when the two digit code representing the number 11 is presented to the pulse counter 21, the binary scalers step to the binary state 100 when the first digit 1 is presented thereto. The flip-flop circuit Q12, Q13 changes its state and therefore the outputs 1A, 2B and 3B are at −4 volts as indicated in Table I. When the second digit 1 is presented to the pulse counter 21, the binary scalers advance to the binary state 010. The flip-flop circuits Q12, Q13 and Q15, Q16 change their state and therefore outputs 1B, 2A and 3B are at −4 volts. Twenty-one additional two digit codes are made available as shown in the second column of Table I, by arranging the second digit of a particular digital code to step the pulse counter 21 through reset and into a second cycle.

Thus it can be seen that the pulse counter 21 counts the first digit of the digital code and counts the sum of the first and second digits of the digital code. For example, if the digital code represents the number 42, the outputs 1B, 2B and 3A will be at −4 volts when the digit 4 is counted and the outputs 1B, 2A and 3A will be at −4 volts when the counter steps to the binary state corresponding to 4 plus 2 or 6. The outputs 1, 2, 3, A or B are available as connection points to the first and second selecting circuits 23 and 25 of FIGURE 1 on conductors 22 and 24 in a manner about to be described.

Figure 5:
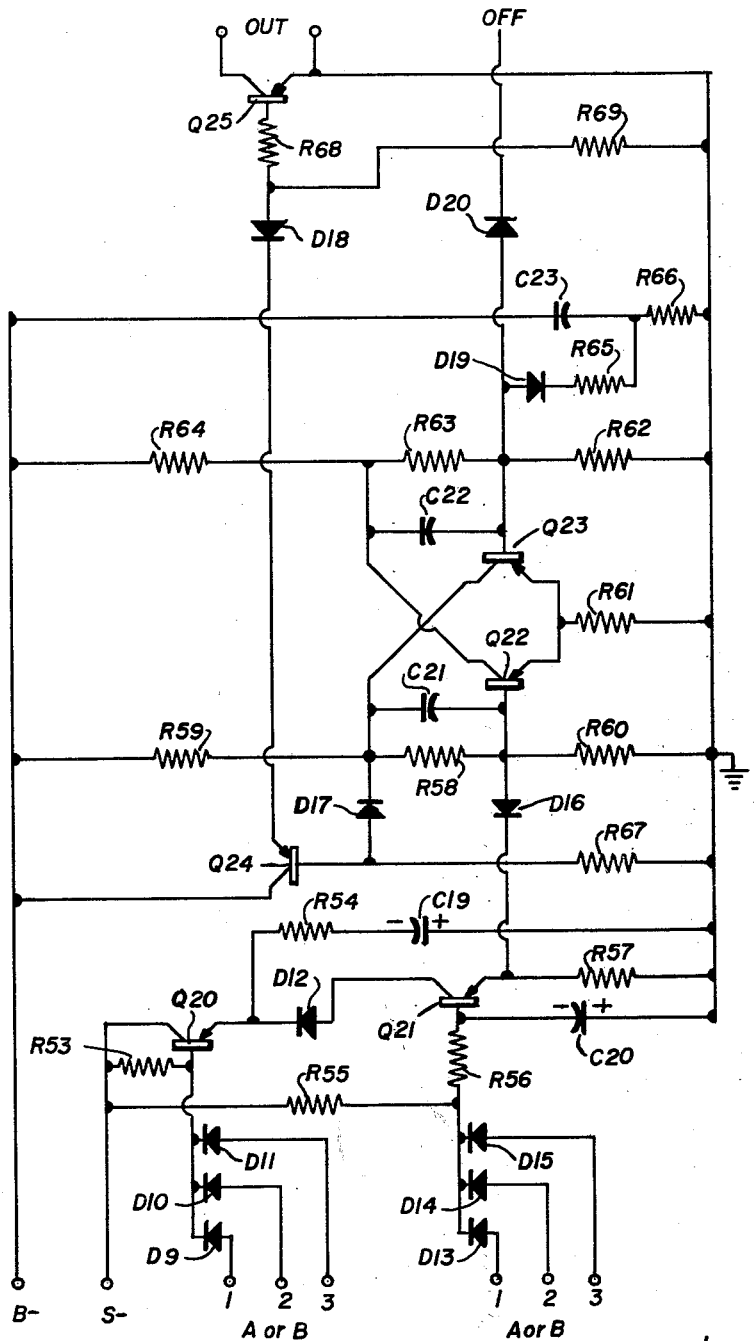
FIGURE 5 is a detailed schematic diagram of the first and second selecting means, the memory means and the power control circuit of FIGURE 1.

FIGURE 5 will now be described for a more detailed understanding of the following circuits shown in FIGURE 1: the first and second selecting circuits 23 and 25, the memory circuit 26 and the power control circuit 28. As previously stated the selecting circuits and the memory circuit may be duplicated to provide means to switch "off" the selected equipment in response to a two digit code as well as to switch "on" the selected equipment. As these circuits are identical, it will only be necessary to show and describe the "on" arrangement.

The first selecting circuit 23 of FIGURE 1 comprises diodes D9 to D11 and a transistor Q20. The diodes D9 to D11 are respectively connected at their anodes to outputs 1, 2 and 3, A or B of the binary scalers in FIGURE 4. The outputs A or B are chosen from Table I for the desired first digit of the digital code. The common cathode output from the diodes D9 to D11 is coupled to the base input of the transistor Q20. Operating voltage is connected from the bus S to the collector of transistor Q20 when the control carrier signal is first detected. The second selecting circuit 25 similarly comprises diodes D13 to D15 and a transistor Q21. The outputs A or B to which the anodes of the diodes D13 to D15 are connected are similarly chosen from Table I for the desired second digit of the digital code. The memory circuit 26 comprises resistor R54 and capacitor C19 serially connected from the emitter of the transistor Q20 to ground. The emitter output of the transistor Q20 is directly coupled to the collector of the transistor Q21.

At initial reset and when the pulse counter 21 registers a first digit for which diodes D9 to D11 are not wired, −0.5 volt is connected to at least one anode of the diodes D9 to D11 and therefore, at least one of the diodes is conducting. When the pulse counter 21 has registered a first digit for which the diodes D9 to D11 are wired, all the anodes will be at −4 volts and therefore, all of the diodes will cease to conduct. The transistor Q20 is then biased on through a resistor R53 and acting as an emitter follower conducts, charging the capacitor C19 through the current limiting resistor R54. The transistor Q20 is again held out of conduction when the second digit appears in the pulse counter 21, but the capacitor C19 remains charged. Similarly, when the pulse counter 21 has registered the sum of the first and second digits for which diodes D13 to D15 are wired, these diodes will all cease to conduct. The transistor Q21 acting as an emitter follower, then conducts using the charged voltage on the capacitor C19 as its power supply, and a voltage is developed across resistor R57, which is used to trigger the power control circuit 28 (FIGURE 1). When current flows through the transistor Q21 and the resistor R57, the capacitor C19 discharges.

Some delay must be incorporated to prevent the transistors Q20 and Q21 from recognizing the digits for which they are wired, when these correct digits appear briefly in the pulse counter 21 as it is stepping to some greater number. The first digit delay is the time required to charge the capacitor C19 and the second digit delay is provided by the time constant of resistors R55 and R56 and a capacitor C20. Thus a definite pause is required after a digit has been transmitted, to allow for selector action.

The power control circuit 28 of FIGURE 1 comprises transistors Q22, Q23 connected as a bistable flip-flop circuit, and acting as a power switch memory, a transistor Q24 (the drive circuit 30 of FIGURE 1) and a transistor Q25 (the power switch 31 of FIGURE 1). Base triggering of the flip-flop circuit Q22, Q23 has been found suitable for this particular application. The emitter output from the transistor Q21 is directly coupled to the base of the transistor Q22. Although not shown, it is understood that the output from the further second selecting circuit of the "off" arrangement is directly coupled to the base of the transistor Q23. The collector output of the transistor Q23 is directly coupled to the base of the transistor Q24. The emitter output of the transistor Q24 is directly coupled to the base of the power switch transistor Q25. The output from the power switch is taken across the collector and emitter of the transistor Q25 and is adapted to be connected in series with the selected equipment and its power supply.

The local battery supply 34 of FIGURE 1 is connected at all times from B− to the flip-flop circuit Q22, Q23 and to the transistor Q24. The local battery supply 34 of FIGURE 1 is also connected from B− through a capacitor C23 and a resistor R66 to ground. The junction of the capacitor C23 and the resistor R66 is directly coupled to the base of the transistor Q23 through a current limiting resistor R65 and a diode D19. The capacitor C23-resistor R66 network serves as a reset circuit for the power control circuit 28 of FIGURE 1. When the local battery supply is first connected, the base of the transistor Q23 is momentarily connected to B− through the low reactance of the capacitor C23 and thus, the transistor Q23 is driven into conduction. The capacitor C23 then charges by the base current and through the resistor R66, and when fully charged, is freed from the base by diode D19. This leaves the transistor Q23 conducting and the transistors Q22, Q24 and Q25 non-conducting. As the local battery supply 34 of FIGURE 1 is connected at all times, reset occurs only on the initial connection of the battery. When a voltage developed across the resistor R57 is applied to the base of the transistor Q22 as a result of a digital code being selected, the flip-flop circuit Q22, Q23 changes its state. The transistor Q23 ceases to conduct, the transistor Q22 conducts, the transistors Q24 and Q25 are driven into conduction and power is connected to the selected equipment. After the control period is ended busses M and S become deenergized, but the state of the flip-flop circuit Q22, Q23 remains unaltered and the power switch transistor Q25 remains on. When a voltage is applied to the base of the transistor Q23 as a result of another digital code being selected in the off arrangement, the flip-flop circuit Q22, Q23 returns to its original state, the transistor Q23 conduits, and the transistors Q22, Q24 and Q25 open to disconnect power from the selected equipment.

The selecting circuits show good discrimination against numbers for which they are not wired. Incorrect first digits will not free the transistor Q20, and hence the capicitor C19 will receive no charge. Thus even if the sum of the digits is acceptable to the transistor Q21, it will be held out of conduction, because the power supply capacitor C19 is not charged. If the first digit were correct but the second digit were incorrect, the transistor Q21 would not be released by the pulse counter 21 and no switching would occur.

FIGURE 6, which provides a modified embodiment of FIGURE 5, will now be described. With this embodiment, the apparatus is capable of operating over a wider temperature range than with the embodiment described in FIGURE 5. The temperature range can be extended by using a transistor circuit for the memory circuit 26 of FIGURE 1, thereby permitting the use of tantalum electrolytic capacitors which are more stable with temperature changes and the use of lower resistance values. Circuit elements unchanged from FIGURE 5, will be given like designations where applicable.

The first selecting circuit 23 of FIGURE 1 comprises the diodes D9 to D11 as before and a transistor Q26. Similarly, the second selecting circuit comprises the diodes D13 to D15 as before and a transistor Q27. The first and second digit delays are respectively provided by the time required to charge capacitors C24 and C25. The connections to the diodes D9 to D11 and D13 to D15 are reversed, however, because the apparatus is designed to operate in the opposite phase to the embodiment of FIGURE 5. Consequently, when choosing the outputs from Table I, the A outputs must be substituted for the B outputs and vice-versa. Therefore, all outputs are at —0.5 volt when the pulse counter registers a first or second digit for which the diodes D9 to D11 or D13 to D15 are respectively wired.

The memory circuit 26 of FIGURE 1 comprises a transistor Q28 and a capacitor C26. A transistor Q29 is coupled between the transistors Q26 and Q28 to function as a phase inverter so that the transistor Q28 is driven with the proper polarity. A transistor Q30 drives the flip-flop circuit Q22, Q23 and a transistor Q31 is coupled between the transistors Q27 and Q30 to function as a phase inverter.

At initial reset and when the pulse counter 21 registers a first digit for which the diodes D9 to D11 are not wired, —4 volts is connected to at least one cathode of the diodes D9 to D11 and, therefore, at least one of the diodes is conducting. When the bus S becomes energized, the capacitor C24 is discharged and the emitter of the transistor Q26 is sufficiently negative to hold the transistor Q29 in conduction, which with its collector near ground potential, holds the transistor Q28 out of conduction.

When the pulse counter 21 registers a first digit for which the diodes D9 to D11 are wired, all cathodes will be at —0.5 volt and, therefore, all of the diodes will cease to conduct. The capacitor C24 slowly charges, the emitter of the transistor Q26 falls toward ground potential and the transistor Q29 goes out of conduction. The collector of the transistor Q29 rises toward the potential of the S-bus driving the transistor Q28 into conduction through a diode D21 and charging the capacitor C26. The transistor Q29 is again held in conduction when the second digit appears in the pulse counter 21, but the capacitor C26 remains charged holding the transistor Q28 in conduction. Similarly, when the pulse counter 21 has registered the sum of the first and second digits for which the diodes D13 to D15 are wired, these diodes will all cease to conduct. The capacitor C25 slowly discharges and the emitter of the transistor Q27 falls toward ground potential and the transistor Q31, which received its power supply from the voltage on the emitter of the transistor Q28, goes out of conduction. The transistor Q30 acting as an emitter follower, then conducts using the voltage on the emitter of the transistor Q28 as its power supply, and a voltage is developed across resistor R83, which is used to trigger the power control circuit 28 of FIGURE 1 as before. The rest of the circuit functions substantially the same as in FIGURE 5 and will not be described.

The apparatus shows good discrimination against interference of a random nature. For example, it completely rejects Morse signals. However, the presence of any high level radio signals will activate the local power switch circuit 40 of FIGURE 1 and the pulse counter 21 will count any signal breaks. Hence, any pulses transmitted during such interference is merely added to the count already stored in the pulse counter to give counts that the selecting circuits will not recognize. Therefore, the control operator at the transmitter will not be able to control the operation of selected equipment in the presence of high level interference. However, the noise rejection circuit 16 and the integrator circuit 18 ensure very reliable operation in the presence of most serious noise interference. The apparatus will not respond to other correctly transmitted digits for which it is not wired, but may be sometimes affected by a long continuous string of numbers such as would not occur in normal operation.

As can be readily appreciated from referring to Table I, the apparatus of this invention has great flexibility of operation. Up to 42 switching functions can be obtained at one remote station by duplicating the first and second selecting circuits 23 and 25 and the memory circuit 26 and providing a power control circuit 28 for each two switching functions required. Alternatively, the apparatus may be located at several remote stations to give one or more combinations of switching functions at each station. It is to be understood that the invention is not limited to the use of three binary scalers as a limited number of switching functions can be achieved using two and the number of switching functions can be greatly increased by using more than three binary scalers.

*Table I*

| Dial Number | 1st Digit | | | 2nd Digit | | | Dial Number | 1st Digit | | | 2nd Digit | | |
|---|---|---|---|---|---|---|---|---|---|---|---|---|---|
| | 1 | 2 | 3 | 1 | 2 | 3 | | 1 | 2 | 3 | 1 | 2 | 3 |
| 11 | A | B | B | B | A | B | 27 | B | A | B | A | B | B |
| 12 | A | B | B | A | A | B | 36 | A | A | A | A | B | B |
| 13 | A | B | B | B | A | A | 37 | A | A | B | B | A | B |
| 14 | A | B | B | A | B | A | 45 | B | B | A | A | B | B |
| 15 | A | B | B | A | A | A | 46 | B | B | A | A | A | B |
| 16 | A | B | B | A | A | A | 47 | B | B | A | A | A | B |
| 21 | B | A | B | A | A | B | 54 | A | B | A | B | A | B |
| 22 | B | A | B | B | B | A | 55 | A | B | A | B | A | B |
| 23 | B | A | B | A | B | A | 56 | A | B | A | A | A | B |
| 24 | B | A | B | A | A | A | 57 | A | B | A | B | B | A |
| 25 | B | A | B | A | A | A | 63 | B | A | A | A | B | B |
| 31 | A | A | B | B | A | B | 64 | B | A | A | A | A | B |
| 32 | A | A | B | A | B | A | 65 | B | A | A | A | A | B |
| 33 | A | A | B | B | A | A | 66 | B | A | A | B | B | A |
| 34 | A | A | B | A | A | A | 67 | B | A | A | B | A | A |
| 41 | B | B | A | A | B | A | 72 | A | A | A | A | B | B |
| 42 | B | B | A | B | A | A | 73 | A | A | A | B | A | B |
| 43 | B | B | A | A | A | A | 74 | A | A | A | A | A | B |
| 51 | A | B | A | B | A | B | 75 | A | A | A | B | B | A |
| 52 | A | B | A | A | A | A | 76 | A | A | A | B | A | A |
| 61 | B | A | A | A | A | A | 77 | A | A | A | B | A | A |

Table II given below lists values and type designations of circuit components suitable for the circuits disclosed in FIGURES 3 to 6:

*Table II*

Transistors:

Q1, Q2 _____ 2N1307
   Q3, Q11 _____ 2N1306
   Q4, Q7, Q8, Q9, Q10, Q12, Q13, Q14,
     Q15, Q16, Q17, Q18, Q19, Q20, Q21
   Q22, Q23, _____ 2N188A
   Q5, Q6, Q24, Q29, Q30, Q31 _____ 2N524
   Q25 _____ 2N456
   Q26, Q27, Q28 _____ 2N417

Table II—Continued

Silicon diodes:
  D2, D4, D5, D12, D17, D18, D1, D3,
    D6, D7, D8, D9, D10, D11, D21,
    D22 _____ No. 1N457
Germanium diodes:
  D13, D14, D15, D16, D19, D20 ____ No. 1N270
Tantalum capacitors:
  C3, C4, C18, C20 _____ 16 mf.
  C1, C5 _____ 4 mf.
Capacitors
  C6, C7, C8, C10, C11, C13, C14, C16,
    C17 _____ .001 mf.
  C9, C12, C15, C21, C22 _____ .01 mf.
  C19 _____ 100 mf., 6 v.
  C23 _____ .25 mf.
  C2 _____ .5 mf.
Tantalum capacitors:
  C24, C25 _____ 12 mf., 15 v.
  C26 _____ 25 mf., 6 v.
Resistors:
  R8, R66, R70, R77 _____ 22K
  R9 _____ 5.6K
  R10 _____ 120 ohms
  R11 _____ 100K
  R12, R18, R33, R38, R44, R61 _____ 330 ohms
  R4, R13, R14, R24, R34, R43, R52,
    R67, R74, R81, R83 _____ 10K
  R15, R21, R26, R29, R37, R41, R47,
    R1, R48, R59, R64, R65, R73, R80 2.2K
  R16, R20, R27, R30, R36, R40, R46,
    R49, R58, R63, R71, R78 _____ 6.8K
  R17, R28, R31, R35, R39, R45, R50,
    R60, R62 _____ 3.3K
  R2, R3, R19, R69 _____ 1K
  R22 _____ 820 ohms
  R5, R23, R32, R42, R51, R72, R76,
    R79 _____ 4.7K
  R6, R7, R25 _____ 3.9K
  R56 _____ 82K
  R53, R55 _____ 27K
  R57, R84 _____ 1.2K
  R54 _____ 270 ohms
  R68 _____ 22 ohms
  R75 _____ 15K
  R82 _____ 8.2K
Inductor:
  L1 _____ 10 henries

What I claim as my invention is:

1. Apparatus for use in a remote control system to detect a predetermined digital code having a first and second series of pulses each series representing a digit of said digital code, comprising receiving means adapted to be responsive to a source of said first and second series of pulses, a pulse counter responsive to said receiving means for the sequential counting of each of said series of pulses and for the sequential registering of the count of said first series of pulses and the count of the sum of said first and second series of pulses, first selecting means adapted to select from said pulse counter the registered count of the first series of pulses and during the interval between said first and second series of pulses to produce a first voltage representing the first digit of said predetermined digital code, second selecting means, and a memory means interposed between said first and second selecting means, said memory means being responsive to said first voltage to render said second selecting means operable, said second selecting means being adapted to select from said pulse counter the registered count of a predetermined sum of said first and second series of pulses and thereafter to produce a second voltage representing said predetermined digital code.

2. The apparatus of claim 1 wherein said receiving means is adapted to be responsive to a source of said series of pulses comprising a radiated carrier signal negatively modulated to produce said series of pulses appearing as gaps in said carrier signal.

3. The apparatus of claim 2, wherein said receiving means comprises a radio receiver, said receiver being adapted to be responsive to said radiated carrier signal, a noise rejection circuit responsive to said receiver, first drive means responsive to said noise rejection circuit, an integrating circuit responsive to said first drive means, a pulsing circuit adapted to reconstruct said series of pulses from said integrating circuit and a differentiating circuit responsive to said pulsing circuit and adapted to construct pulses to trigger said pulse counter.

4. The apparatus of claim 3, wherein a first power switch circuit is provided to connect power to certain components of said apparatus only when said radiated carrier signal is received in said receiver, said first power switch circuit being responsive to said first drive means to connect power to said pulse counter, said pulsing circuit, said first selecting means and said memory means.

5. The apparatus of claim 4, wherein said pulse counter comprises at least two cascade binary scalers having a reset circuit adapted to be responsive to said first power switch circuit to set said binary scaler before said pulse counter counts said series of pulses.

6. The apparatus of claim 4, wherein a time delay network is interposed between said first drive means and said first power switch circuit, said time delay network having a predetermined time constant to maintain said first power switch circuit activated during the occurrence of said series of pulses when said carrier signal is missing.

7. The apparatus of claim 1, wherein said predetermined digital code is adapted to control the switching on of selected equipment, further comprising power control means, said power control means being adapted to be responsive to said second voltage from said second selecting means to connect power to said selected equipment.

8. The apparatus of claim 7, comprising further first and second selected means and further memory means similarly connected together and to said pulse counter, said further second selecting means producing a third voltage representing another predetermined digital code, said power control means being adapted to be responsive to said third voltage to disconnect power from said selected equipment, once connected.

9. The apparatus of claim 8, wherein said power control means comprises a bistable flip-flop circuit adapted to be responsive at its inputs to said second and third voltages, a second drive means and a second power switch circuit adapted to connect or disconnect power to said selected equipment, said second voltage triggering said flip-flop circuit to one stable state, said third voltage triggering said flip-flop circuit to its original stable state, said drive means being responsive to said one stable state of said flip-flop circuit to energize said second power switch circuit and to said original stable state to de-energize said second power switch circuit.

10. The apparatus of claim 1, wherein said pulse counter comprises at least two cascaded binary scalers, a predetermined output from each said binary scaler being adapted to operatively connect the registered count of said predetermined said first series of pulses to said first selecting means, a predetermined output from each said binary scaler being adapted to operatively connect the registered count of said predetermined sum of said first and second series of pulses to said second selecting means.

11. The apparatus of claim 10 wherein each said first and second selecting means comprises three diodes and a transistor, each said diode being responsive to one predetermined output from each said binary scaler, said diodes having a common output, said transistor being operably connected to said common output when each said diode is non-conducting.

12. In a radio remote control system including a transmitter for transmitting by negative modulation of a radiated carrier signal, a predetermined digital code having at least a first and a second series of pulses, each series representing a digit of said digital code, receiving means at a remote station for receiving and detecting said radiated carrier signal containing said series of pulses, a pulse counter responsive to said receiving means for the sequential counting of said first and second series of pulses and for the sequential registering of the count of said first series of pulses and the count of the sum of said first and second series of pulses, first selecting means adapted to select from said pulse counter the registered count of said first series of pulses and during the interval between said first and second series of pulses to produce a first voltage representing the first digit of said predetermined digital code, second selecting means, and a memory means interposed between said first and second selecting means, said memory means being responsive to said first voltage to render said second selecting means operable, said second selecting means being adapted to select from said pulse counter the registered count of a predetermined sum of said first and second series of pulses and thereafter to produce a second voltage representing said predetermined digital code.

13. A radio remote control system as defined in claim 12 wherein said radiated carrier signal is negatively modulated in said transmitter by means of keying means connected to said transmitter, the operation of said keying means interrupting said carrier signal a number of times corresponding to a digit keyed to form said series of pulses.

14. In a radio remote control system, receiving means at a remote station adapted to receive and detect a radiated carrier signal negatively modulated to include at least a first and a second series of pulses, each series representing a digit of a predetermined digital code, a pulse counter responsive to said receiving means for the sequential counting of said first and second series of pulses and for the sequential registering of the count of said first series of pulses and the count of the sum of said first and second series of pulses, first selecting means adapted to select from said pulse counter the registered count of said first series of pulses and during the interval between said first and second series of pulses to produce a first voltage representing the first digit of said predetermined digital code, second selecting means, and a memory means interposed between said first and second selecting means, said memory means being responsive to said first voltage to render said second selecting means operable, said second selecting means being adapted to select from said pulse counter the registered count of a predetermined sum of said first and second series of pulses and thereafter to produce a second voltage representing said predetermined digital code.

15. A radio remote control system as defined in claim 14 wherein said receiving means comprises an antenna for receiving said carrier signal, a receiver responsive to said antenna for detecting said receiver carrier signal, a noise rejection circuit responsive to said receiver, drive means responsive to said noise rejection circuit, an integrating circuit responsive to said drive means, a pulsing circuit adapted to reconstruct said seires of pulses from said integrating circuit and a differentiating circuit responsive to said pulsing circuit adapted to construct pulses to trigger said pulse counter.

References Cited by the Examiner
UNITED STATES PATENTS

| | | | |
|---|---|---|---|
| 2,558,447 | 6/51 | MacSorley | 328—48 |
| 2,697,823 | 12/54 | Undy | 343—225 X |
| 2,886,243 | 5/59 | Sprague et al. | 235—197 |
| 2,921,740 | 1/60 | Dobbins et al. | 235—197 |
| 2,950,471 | 8/60 | Hoeppner | 325—325 X |
| 3,024,991 | 3/62 | Foote | 235—156 |

NEIL C. READ, *Primary Examiner.*

WILLIAM C. COOPER, *Examiner.*